United States Patent [19]

Mouly et al.

[11] Patent Number: 4,743,284
[45] Date of Patent: May 10, 1988

[54] RIBBON SEVERING SUPPORT

[75] Inventors: Raymond J. Mouly, Pittsburgh; Dewitt W. Lampman, Gibsonia, both of Pa.

[73] Assignee: PPG Industries, Inc., Pittsburgh, Pa.

[21] Appl. No.: 947,252

[22] Filed: Dec. 29, 1986

[51] Int. Cl.[4] .............................................. C03B 13/08
[52] U.S. Cl. ........................................ 65/113; 65/70; 65/97; 65/105; 65/112; 65/174; 65/176
[58] Field of Search .................. 65/97, 105, 112, 70, 65/113, 174, 176

[56] References Cited

U.S. PATENT DOCUMENTS

| | | | |
|---|---|---|---|
| 1,339,229 | 5/1920 | Slingluff. | |
| 1,560,077 | 1/1922 | Gelstharp. | |
| 2,243,149 | 2/1936 | Despret. | |
| 2,442,242 | 5/1948 | Lewis | 65/273 |
| 3,223,499 | 12/1965 | Cypher et al. | 65/104 X |
| 3,453,097 | 7/1969 | Hafner | 65/12 |
| 3,486,673 | 12/1969 | Madge | 225/2 |
| 3,531,273 | 9/1970 | Discry | 65/97 X |
| 3,543,979 | 12/1970 | Grove et al. | 225/2 |
| 3,584,773 | 6/1971 | Grove et al. | 225/2 |
| 3,690,527 | 9/1972 | Bustraan et al. | 225/4 |
| 3,754,884 | 8/1973 | McDavid et al. | 65/97 |
| 3,843,346 | 10/1974 | Edge et al. | 65/65 |
| 3,875,766 | 4/1975 | French | 65/97 |
| 3,885,943 | 5/1975 | Chui | 65/97 |
| 3,930,825 | 1/1976 | Chui | 65/62 |
| 3,934,995 | 1/1976 | French | 65/97 |
| 3,935,419 | 1/1976 | Lambert et al. | 65/176 |

FOREIGN PATENT DOCUMENTS 2567872 7/1984 France.

Primary Examiner—Arthur Kellogg
Attorney, Agent, or Firm—Andrew C. Siminerio

[57] ABSTRACT

A sliding support table to support a continuously advancing glass ribbon during severing. The ribbon is supported by and moves over the sliding support table which moves along the direction of the glass ribbon travel between stationary upstream and downstream supports. Top and bottom line heaters supported on the table direct flames towards the major surfaces of the glass ribbon along a line cut. A blade and anvil arrangement supported on the table, sever the glass along the heated line of cut when the line of cut is positioned therebetween. The table advances along with the glass ribbon to support the ribbon during the heating and severing operation. The line heaters and blade and anvil arrangement may provide both a linear or nonlinear line of cut.

58 Claims, 4 Drawing Sheets

RIBBON SEVERING SUPPORT

BACKGROUNG OF THE INVENTION

1. Field of the Invention

This invention relates to an apparatus for and method of cutting glass and more particularly to a sliding support table arrangement to support a continuously advancing heated glass ribbon as it is cut.

2. Technical Considerations

Fabrication of flat or bent glass products conventionally requires two separate and distinct processes; primary processing and secondary processing.

The primary processing includes forming a glass ribbon from molten glass by either floating the molten glass on a bath of molten metal, such as tin, or pulling a sheet of glass from a molten glass bath. In the float forming process, the molten glass is deposited and floated on a molten tin bath to form a ribbon, for example, as disclosed in U.S. Pat. No. 3,843,346 to Edge et al.. The float glass ribbon starts to cool and its thickness is established while on the tin bath. The ribbon is thereafter lifted off the tin bath and conveyed into an annealing zone where it is controllably cooled to a temperature below its strain point. In the sheet forming process, the thickness of the glass sheet is established while it is being pulled from the pool of molten glass and is cooled thereafter, for example, as disclosed in U.S. Pat. No. 1,339,229 to Slingluff. In both ribbon forming processes, after annealing, the ribbon is cut into individual glass sheets for subsequent secondary processing.

Secondary processing may include any number of additional glass sheet processing procedures. For example, large sheets may be cut into smaller more handleable sheets prior to cutting the glass sheet to its final shape. After cutting the glass to shape, it may be drilled and/or edged and/or bent to shape. The drilling and edging operations are generally performed while the glass is at room temperature. The shaping operation is generally performed after the cut glass is reheated to its heat deformable temperature, approximately 1150° F.–1250° F. (621° C.–677° C.) for typical soda-lime-silica glass. The heating and bending operations may be performed by any of a number of well-known methods.

After the cold processing and/or heating for bending, the glass may be heat strengthened by controllably cooling the heated glass sheet down through its annealing range to anneal or temper the glass.

It is believed that the glass ribbon may be cut either into large sheets or into its final desired outline shape immediately upon its conveyance out of the ribbon forming operation or soon thereafter. In particular, the glass ribbon could be cut after its thickness has been established in a sheet forming operation, or the glass ribbon could be cut after it is lifted off of the tin bath in a float forming process. Such an arrangement would effectively integrate portions of the primary and secondary processes and effect a significant cost savings by eliminating certain primary and secondary processing steps, for example, storage of glass after the primary processing, recutting the glass to proper size and shape, and heating the sheets for bending.

One of the proposed cutting operations requires that the cutting equipment be located only on one side of the ribbon, for example, scoring the advancing ribbon prior to separating the glass along the score. With such an arrangement, the ribbon may be fully supported throughout the cutting operation.

U.S. Pat. Nos. 3,486,673 to Madge; 3,690,527 to Bustrann et al.; 3,754,884 to McDavid et al.; and 3,875,766 to French teach the severing of a horizontally drawn glass ribbon. In each, the glass ribbon is cooled so that a major surface of the glass is susceptible to scoring by a scribing apparatus and subsequently fractured along the scored line. Since the glass is scored only on the upper surface of the glass ribbon, it may be supported on its lower surface throughout the scoring and fracture operations.

U.S. Pat. Nos. 1,560,077 to Gelstharp and 2,243,149 to Despret teach the severing of a horizontally drawn glass ribbon in a sheet glass operation while the ribbon is still in a plastic state. In both Gelstharp and Despret, the cutting device penetrates the glass through the top surface only, so that the bottom surface may be supported throughout the cutting operation.

U.S. Pat. No. 3,934,995 to French teaches a method for cutting discreet sheets from an advancing glass ribbon as it emerges from a float line by subjecting a portion of the ribbon to a controlled quench to cool the glass, scribing the glass along the cooled line, and rapidly breaking the glass along the scribed line. Again, only one surface of the ribbon is scored so that it may be supported throughout the cutting operation.

Another cutting technique requires only a single cutting step, for example, using vertically aligned rolls with a cutting blade that extends transversely across an advancing heat softened ribbon such that the glass is cut by rotating the rolls in the direction of the ribbon advancement to penetrate the glass with the blade. As a result the cutting rolls may remain horizontally stationary and support devices may be placed on either side of the cutting rolls to provide adequate glass ribbon support.

French Patent Publication No. 2,567,872 to Diaz et al. teaches a method for cutting glass sheets still in the plastic state. The glass passes between a pair of rotating knives which pinch the glass almost through its entire thickness. A first set of knives is positioned radially around a cutting roll to continuously cut the glass sheet in its longitudinal direction, and a second set of knives is positioned longitudinally along the length of the cutting rolls to periodically cut the glass ribbon in a transverse direction. The cutting knives are horizontally stationary and do not translate during cutting. As a result, the glass ribbon may be supported on both sides of the cutting operation.

Still another cutting technique uses lasers to cut the glass ribbon. The lasers direct their heat towards the glass for a sufficient time and distance required to vaporize the glass. If the laser heat is concentrated only on the upper surface of the advancing glass ribbon, the laser can move above the ribbon and the ribbon may be fully supported from below. But, if the lasers are directed at both the upper and lower surfaces of the advancing ribbon, laser equipment must be positioned below and moved along with the ribbon. Any ribbon support that would interfere with the laser movement would have to be removed. As a result, the glass ribbon would be unsupported over some portion of the length of the laser movement.

U.S. Pat. Nos. 3,453,097 to Hafner; 3,543,979 to Grove et al.; 3,885,943 and 3,930,825 to Chui; and 3,935,419 to Lambert et al. teach the cutting of glass with a laser beam. In each patent, the laser heat is directed only at the upper surface of the glass so that the ribbon can be fully supported from beneath.

Another cutting technique requires equipment to be placed above and below the ribbon and move along with the ribbon for some predetermined distance. As with some laser cutting techniques, this will result in the glass ribbon being unsupported over some distance during the cutting operation.

U.S. Pat. No. 3,584,773 to Grove, teaches a method of cutting a cooled glass ribbon by employing high frequency dielectric heating of the glass through its thickness to cause a controlled fracture to run along the cutting line. A pair of electrodes placed above and below the glass move with the glass ribbon via an undisclosed mechanism so that the ribbon is supported only by the lower electrode in the vicinity of the cut while being heated.

These patents disclose glass cutting techniques, but they are not concerned with the support of the advancing glass ribbon when the cutting operation requires that the cutting equipment be positioned above and below the ribbon and travel with the ribbon so that they may operate on both sides of the ribbon, so as to minimize the unsupported length of the ribbon during the cutting operation. It would be advantageous to have a glass ribbon support arrangement that could minimize this unsupported length so as to reduce any distortion that may occur as a result of the glass cutting operation.

SUMMARY OF THE INVENTION

An object of this invention is to provide an apparatus for severing a continuously advancing glass ribbon. The ribbon is supported by and moves over a sliding support table which moves along the direction of the glass ribbon travel between stationary upstream and downstream supports. Top and bottom line heaters supported on the table direct flames towards the major surfaces of the glass ribbon along a line of cut. A blade and anvil arrangement supported on the table, sever the glass along the heated line of cut when the line of cut is positioned therebetween. The table advances along with the glass ribbon to support the ribbon during the heating and severing operation. The line heaters and blade and anvil arrangement may provide both a linear or nonlinear line of cut.

In one particular embodiment of the invention, the table includes a main body portion with a first and second set of spaced finger supports positioned on opposing ends of the main body. The bottom heater and the anvil member are positioned in slotted portions of the main body portion so as to allow the glass ribbon to advance thereover. When the table is in a first position, the first set of spaced fingers are interposed between and registered with a set of finger supports extending downstream from said upstream support. When the table is in a second position, the second set of fingers are interposed between and registered with a set of fingers extending upstream from said downstream support. During the heating and severing operation, the table moves from the first to the second position. After severing, this table returns to the first position.

The main body portion and spaced finger supports of the sliding table may include a gas hearth support bed, a plurality of conveying rolls and discs to support the advancing glass or be made of a solid material coated with a material that will only minimally affect the optical quality of the glass ribbon it supports.

Another object of the invention is to provide a method of severing advancing glass along a selected line of cut. A heating pattern to selectively heat the line of cut is established on the advancing glass. A first moveable support moves with and supports the advancing glass as it is selectively heated. The glass is then divided along the heated line of cut while it is advancing. A second support moves with and supports the advancing glass as it is divided.

In one particular embodiment of this invention, the heating and dividing occurs while the glass is supported by a common support table. The line heaters, which may be mounted on the table, heat the glass as the table moves from its original position along with the glass. After the proper heating pattern is established along the desired line of cut, the advancing rate of the table relative to the glass is reduced so as to allow the glass to advance relative to the table, which thereafter increases its advancing rate to approximate that of the advancing glass. A blade and anvil arrangement mounted on the table thereafter divides the glass along the heated line of cut. The cut glass piece is removed and the table moves back to its original position.

Still another object of this invention is to provide a glass article severed from a glass sheet or glass ribbon that has high quality optics and improved edge strength and quality.

DETAILED DESCRIPTION OF THE INVENTION

The present invention is presented with respect to its use in cutting an advancing soda-lime-silica float glass ribbon, but it should be appreciated that the invention may be used in any severing operation where an advancing material must be supported during cutting, and in particular, in any type of glass forming operation or for cutting glass of any composition.

In describing the present invention a reference will be made to certain properties and reference temperatures of the glass. "Annealing point" and "strain point" are defined as the temperatures that correspond either to a specific rate of elongation of a glass fiber when measured by ASTM Method C-336 or a specific rate of midpoint deflection of a glass beam when measured by ASTM Method C-598. At the annealing point, internal stresses are subsequently relieved in a matter of minutes. At the strain point, internal stresses are substantially relieved in a matter of hours. The range of temperatures between the annealing point and the strain point is called the annealing range. During the heat processing of glass, its temperature is lowered slowly (annealing) or quickly (tempering) through the annealing range. For typical soda-lime-silica float glass, the annealing point temperature is generally within the range of about 1000° F.–1040° F. (538° C.–560° C.), the strain point temperature is generally within the range of about 925° F.–970° F. (496° C.–521° C.), and the annealing range is about 925° F.–1040° F. (496° C.–560° C.). "Float glass optical quality" can be characterized by the optical power of the glass' dominant transmitted defects. The defects, in the form of surface irregularities, generally have a wavelength in the range of approximately 0.75 inches -2 inches (1.96 centimeters–5.08 centimeters) and an optical power on the order of approximately 30 millidiopters or less.

Figure 1:
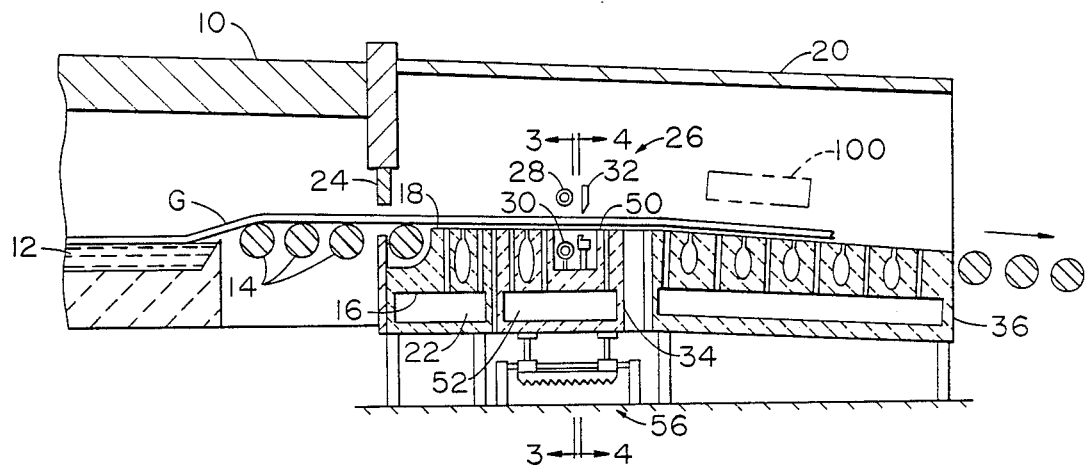
FIG. 1 is a cross-sectional side view of the sliding support table of the present invention used to support an advancing glass ribbon.
Figure 5:
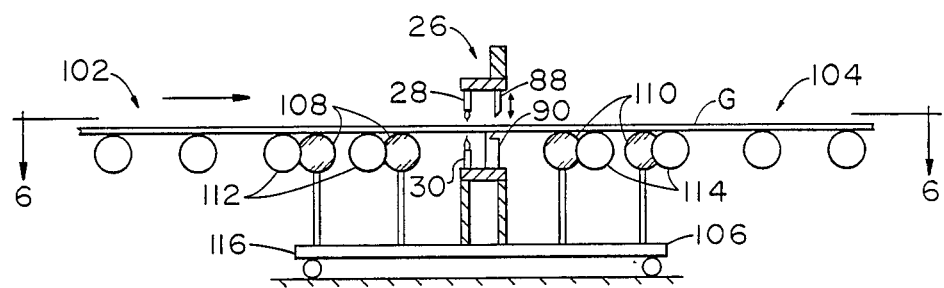
FIG. 5 is a schematic side view of an alternate embodiment of the present invention.

FIG. 1 illustrates a glass float ribbon G as it exits a forming chamber 10. As can be appreciated by those skilled in the art the float glass ribbon G has superior optical qualities and may be used in applications where undistorted viewing through the glass is required. The continuous glass ribbon G is removed from a molten metal bath 12, for example, a molten tin bath, by a series of rolls 14 onto a ribbon support 16 that may include a heated gaseous support bed 18 or additional conveyor rolls (as shown in FIG. 5, to be discussed later) and conveyed into an annealing lehr (not shown). Although not limiting in the present invention, the gas hearth support bed 18 is preferably within a temperature controlled chamber 20 to minimize heat loss in the ribbon, and includes a plenum 22 which forces hot pressurized gas through the upper surface of the gas hearth 18 to provide a cushion of air to support the hot glass ribbon G. Curtain 24 maintains the atmosphere within the forming chamber 10 while the chamber 20 is generally maintained within a temperature range of about 1080° F.–1150° F. (582° C.–621° C.) which is above the float glass annealing point range. The glass ribbon G in the float glass process within this temperature is sufficiently rigid so that it may be handled and contacted by the rolls 14 and other conveying equipment without marking so that its optical qualities remain undisturbed.

As shown in FIG. 1, the glass ribbon G is cut within chamber 20 by severing apparatus 26 which includes a pair of line heaters 28 and 30 positioned above and below the glass ribbon G which heats a desired line of cut to its softening point and a blade arrangement 32, which severs the glass in a manner to be discussed later. Since the heaters cannot instantaneously raise the temperature of the glass through its thickness to that required for severing and it would be impractical to use multiple heater stations, the heaters are preferably moved along with the ribbon G for some distance and time period necessary to heat the glass to the required temperature. Sliding support table 34 of the present invention supports the glass ribbon G as the severing apparatus 26 moves with, heats and cuts the ribbon G.

Figure 2:
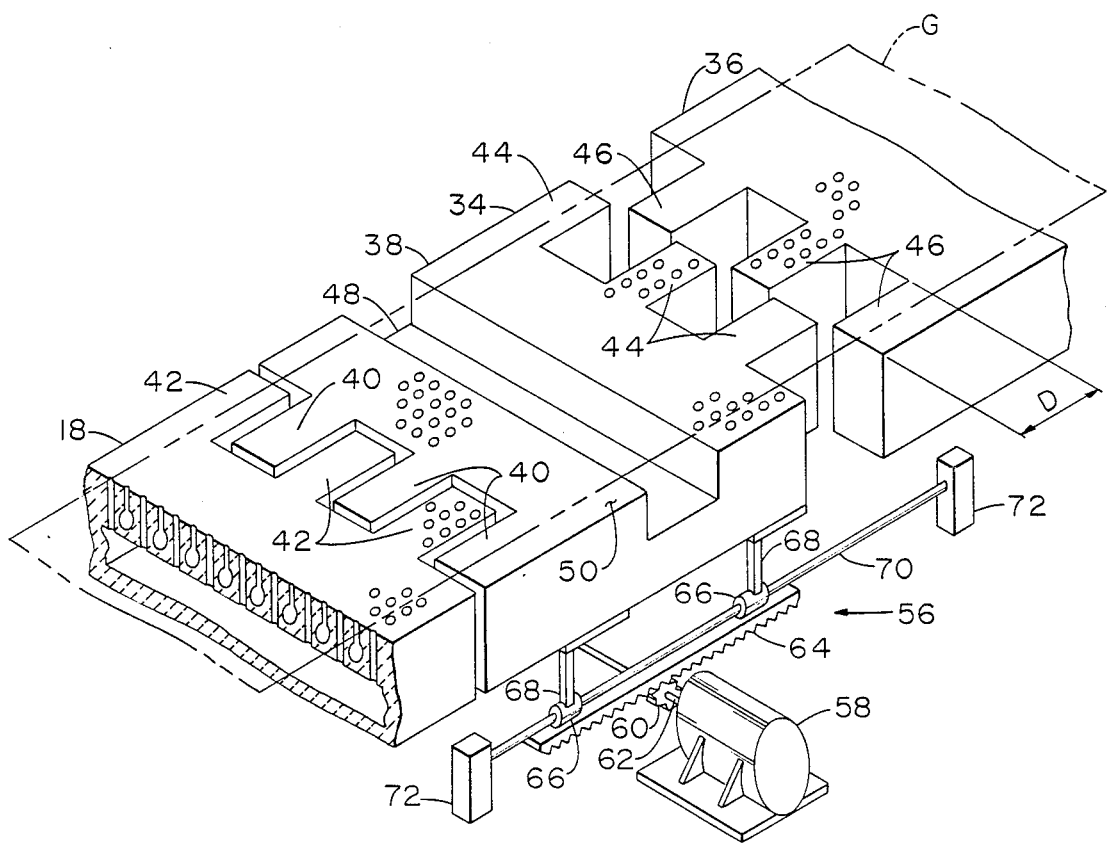
FIG. 2 is an isometric projection of the sliding support table and drive arrangement shown in FIG. 1 with portions removed for clarity.

In an embodiment of the invention illustrated in FIG. 2, the sliding glass table 34 is a gas hearth support carrier, positioned between the gas hearth support bed 18 and a downstream hearth support bed 36 and includes a main body portion 38 with a first set of upstream arm members 40 moveable between members 42 of gas hearth support bed 18 and a second set of downstream arm members 44 moveable between members 46 of downstream gas hearth support bed 36. Slot 48 in main body 36 is provided for the severing apparatus 26 to be discussed later. As shown in FIG. 2, arm members 40 and 44 laterally overlap members 42 and 46, respectively, such that main body portion 38 of the table 34 may move back and forth between support beds 18 and 36 along the advancing direction of the ribbon G without interference between overlapping members. The glass ribbon is supported on a cushion of hot gas supplied to the surface 50 of the table from plenum 52 through passages 54 as shown in FIG. 1.

The table 34 moves along with the ribbon G during the heating and cutting operation so that the advancing ribbon remains fully supported throughout the entire operation. As can be see in FIG. 2, the advancing glass ribbon G is either fully supported across its width by gas hearths 18 or 36 or main body portion 38 of sliding table 34 or it is partially supported across its width by the spaced arm members 40 and 44 of table 34 or members 42 or 46 of gas hearth support beds 18 and 36, respectively, or some combination thereof. In particular, when the table 34 is at its upstream position, i.e., moved to the left as viewed in FIGS. 1 and 2, the glass ribbon G in the vicinity of arm members 40 is supported by both the arm members 40 and members 42 of the gas hearth support 18, while the downstream portion of the ribbon G is supported either by the arm members 44 only or the members 46 only. Similarly, if the table 34 is in its downstream position, i.e., moved to the right in FIGS. 1 and 2, the upstream glass is supported by arm members 40 only, or members 42 only, and the downstream portion is supported by both arm members 44 and members 46. The total travel that the table 34 may move and still maintain support of the glass ribbon G along its length, is indicated by the distance D and is approximately equal to the overlapping length of the members 40 and 42 or the members 44 and 46.

The table 34 is mounted on a slide assembly 56 that reciprocates the table 34 upstream and downstream along the movement of the ribbon G. The slide assembly 56 is preferably capable of moving the table 34 in a downstream direction at a rate equal to the ribbon advancing rate and in an upstream direction at a sufficient speed to reposition the table 34 prior to or at the same time as the next heating and severing operation begins. Although not limited in the present invention, the particular slide assembly 56 depicted in FIGS. 1, 2 and 3 includes a motor 58 powering a drive sprocket 60 via shaft 62. The sprocket 60 meshes with gear racks 64 attached to slip collars 66. The collars 66 are attached to table 34 by stanchions 68 and are slidingly mounted on rails 70 supported by mounts 72. The movement of the slide table 34 by slide assembly 56 may be controlled by a computer 74 (shown only in FIG. 3). In generally, the table 34 is moved by the computer 74 activating the motor 58 to rotate the drive sprocket 60, which in turn moves the gear racks 64 upstream or downstream along the ribbon movement path i.e., left or right, as viewed in FIG. 1, along the the rails 70.

Figure 3:
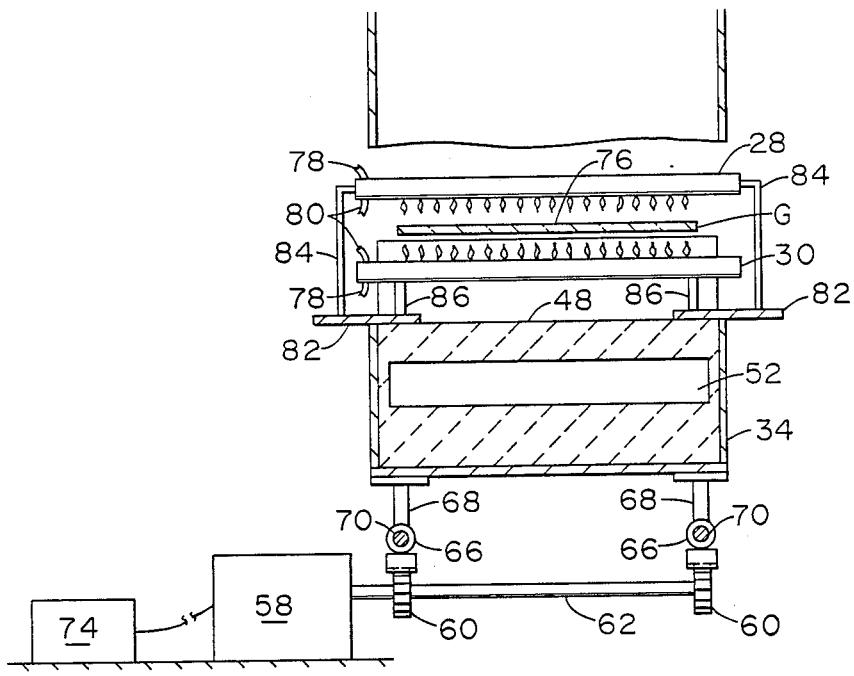
FIG. 3 is a view through line 3—3 of FIG. 1 showing a typical burner arrangement positioned in the slotted portion of said support table.

Referring to FIGS. 2 and 3, heaters 28 and 30 extend across the width of the ribbon G with the lower heater 30 positioned within slot 48 of the table 34. The heaters 28 and 30 direct concentrated heat at the hot glass ribbon G to rapidly heat a line of cut 76, i.e., the line across the ribbon width between the heaters 28 and 30, at or above the glass softening point temperature, i.e., a temperature at which the glass can be severed from the remainder of the ribbon without scoring and fracture, but below the temperature at which the glass is vaporized. For typical soda-lima-silica float glass, the softening temperature generally is in the range of approximately 1325° F.–1375° F. (718° C.–746° C.). The heaters 28 and 30 that may be used in the practices of this invention are of the type that can provide the required concentrated heat and direct it along the line of cut 76, and may be one of any of a number of commercially available heat sources. Although not limited in the present invention, the particular heaters illustrated in FIGS. 1 and 2, are line heaters that direct flames along the selected line of cut 76 of the glass ribbon G. Fuel lines 78 and oxygen lines 80 (optional), supply the burners 28 and 30 with necessary combustants to produce a high temperature flame. Heaters such as resistance-type heaters, high-frequency dielectric heaters, plasma-torch heaters, lasers, or electron beam heaters may also be used in the practice of the invention.

As discussed, supra, the heaters 28 and 30 move at the same speed as the ribbon. After moving in the direction of the ribbon G to heat the line 76 to the softening temperature range, the heaters 28 and 30 return back to their starting position. The heaters 28 and 30 preferably are capable of moving downstream at a rate equal to the ribbon advancing rate and back upstream at a speed sufficient to reposition the heaters 28 and 30 at their starting position as shown in FIGS. 1 and 2 prior to, or at the same time, as a line on the ribbon designated as the next line of cut 76 moves between the heaters. Although not limiting in the present invention, in the particular embodiment illustrated in FIGS. 1 and 3, the heaters 28 and 30 are mounted on and moved along with the table 34. The heaters 28 and 30 are supported on the table 34 by mounting plates 82. Top burner 28, and bottom burner 30 are both mounted on adjustable posts 84 and 86, respectively, so that the vertical distance from the heaters to the corresponding major surfaces of the glass ribbon may be adjusted.

Figure 4:
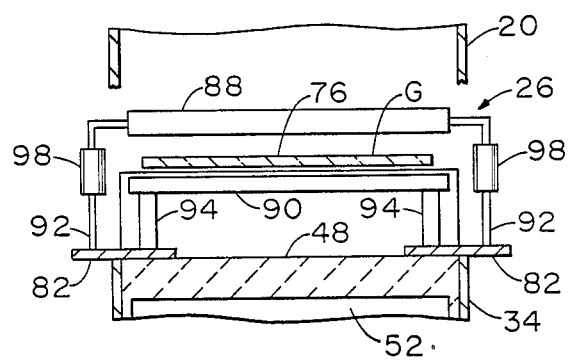
FIG. 4 is a view through line 4—4 of FIG. 1 showing a typical cutting arrangement positioned within the slotted portion of the support table.

After the selected line of cut 76 is heated to its heat softened temperature and, preferably while the remainder of the glass ribbon is still at an elevated temperature, the ribbon G is cut. In a particular severing apparatus 26 illustrated in FIGS. 1 and 4, the glass ribbon is cut by moving a blade or blades through the ribbon G along the heated line 76. A blade 88 is positioned above the ribbon G, aligned with the heated line 80, and an anvil member 90 is positioned below with the glass ribbon G, aligned with the blade 88. Although not limited in the present invention, blade 88 may be supported on posts 92 which is secured to mounting plate 82. The anvil 90, which is located and supported within slot 48 of sliding support table 34, is mounted on leg members 94. If required, the temperature of the blade 88 and/or the anvil 90 may be controlled such that each is sufficiently hot so that the glass ribbon G is not cooled prior to the cut, but not excessively hot, so that the glass ribbon sticks to them.

To sever the glass ribbon G after the line of cut 76 is heated to the heat softening temperature, the downstream movement of the table 34 is reduced relative to the ribbon G so that the line 76 may advance further downstream relative to the heaters 28 and 30 and into an aligned position between the blade 88 and anvil 90. The table 34 then preferably resumes its original downstream movement speed so that there is no relative movement between the line 76 and severing apparatus 26. Thereafter, the blade 88 moves downward and/or the anvil 90 moves upward, severing the ribbon G along the preheated line 76. The blade 88 and/or anvil 90 may be moved vertically in any convenient manner. For example, the blade 88 mounted on posts 92 may be moved by activators 98 or by its own dead weight. It should be noted that the blade 88 does not have to fully penetrate glass ribbon G, but rather it may penetrate most of the glass ribbon thickness, but stop short of cutting completely through the glass and contacting the anvil 90. The ribbon G may, thereafter, be separated from the remaining glass ribbon by a simple bending or snapping procedure after the ribbon G has been slightly cooled. In addition, it is believed that if the severing action of the blade 88 and 90 is sufficiently rapid, the table 34 need not be accelerated to match the advancing rate of the glass ribbon G prior to severing.

During the severing operation, the blade 88 and anvil 90 move along with the table 34. After the severing operation is complete, the blade 88 and/or anvil 90 retract and the table 34 moves back upstream, i.e., to the left as shown in FIG. 1, back to its original position as the severed glass sheet is moved away from the remaining glass ribbon G, for example by sloping the gas hearth support 36 downward away from the forming chamber 10. In this fashion the severed portion of the ribbon G will move away from the remaining glass ribbon. As an alternative, conveyor rolls (not shown in FIG. 1) may be used to move the severed glass sheet away from the advancing ribbon. In addition, the glass sheet may be transferred by top vacuum pick-up 100 that engages the upper surface of the glass sheet while within chamber 20 and shuttles it to a different processing station for subsequent bending, edging, heating, strengthening, annealing, etc.

Because the line heaters 28 and 30 focus concentrated heat along a narrow band of the glass ribbon, there is a possibility of thermal shock in the glass, i.e., the glass may not have sufficient time to internally redistribute stresses established by the high temperature, resulting in the glass fracturing. To avoid this condition the glass to be cut should be heated at least to its strain point temperature, and preferably at or above its annealing point temperature, so as to relieve any internal stresses resulting from the concentrated heating, without fracturing the glass. The entire piece of glass need not be raised to this elevated temperature but rather only that portion of the glass that is in the vicinity of the line of cut 76, i.e., the cutting zone. The width of the cutting zone depends on several factors such as the chemical composition of the glass, its strain point, annealing point and softening point temperatures and the rate in which the line of cut is raised to the softening temperature. When the glass to be cut is conveyed directly from a ribbon forming process such that the portion of the glass in the vicinity of the cut is still above the annealing point temperature, the entire width of the ribbon is the effective cut zone that can redistribute the internal stresses. If the ribbon has been partially cooled, such that the portion of the glass in the vicinity of the cut must be reheated, the cut zone must be sufficiently wide to redistribute any thermal stresses established by the heaters 28 and 30. In a preferred embodiment, the glass ribbon is coming directly from a glass forming operation and the entire glass ribbon is at a sufficient temperature such that the glass will not break when additional concentrated heat is directed toward the ribbon. This elevated temperature may be maintained throughout the line heating and cutting operations by performing these operations in the temperature controlled chamber 20 to limit heat loss.

The quality of the glass edge resulting from cutting the glass as disclosed in the present invention is superior to the glass edged by conventional scoring and fracturing techniques. The former glass edge will have a smooth polished finish. In addition, since it is formed at an an elevated temperature, i.e., at least at the strain point temperature, stresses in the glass along the cut line are redistributed and the possibility of venting at the line of cut 76 is reduced. Furthermore, due to the high temperatures, the glass may flow and heal any defects in the glass edge before it is cooled. As a result, the edge has a high mechanical strength and is more resistant to thermal stresses than a glass edge formed by conventional scoring and fracturing techniques.

In addition, the slotted support table 34 of the present invention reduces the maximum unsupported length of the advancing glass ribbon G to the width of the slot 48. By minimizing the unsupported length of the advancing ribbon and performing the heating and cutting operation within a temperature controlled chamber 20 the float glass optical quality of the glass ribbon will be maintained.

As can now be appreciated by one skilled in the art various changes may be made from the illustrative embodiment without departing from the spirit of the invention. These modifications may include, but are not limited to, the use of electrodes or lasers as heaters to heat the line of cut 76 to the required softening point temperature. In addition, the heater and/or cutter may be mounted on a frame separate from the sliding support table 34. Furthermore, the gas hearth support bed 18 may be linked to downstream gas hearth 36 by an interconnecting plenum section (not shown) such that the sliding table 34 moves thereover.

It is further contemplated that conventional cutting techniques may be used in conjunction with the moving support table 34. Although not limited in the invention,equipment, such as a numerical controlled cutting device (not shown), may be utilized to score the glass surface. The fissure formed by the scoring operation is thereafter driven through the glass sheet thickness by conventional techniques, such as bending the glass along the score, to sever the glass.

Figure 6:
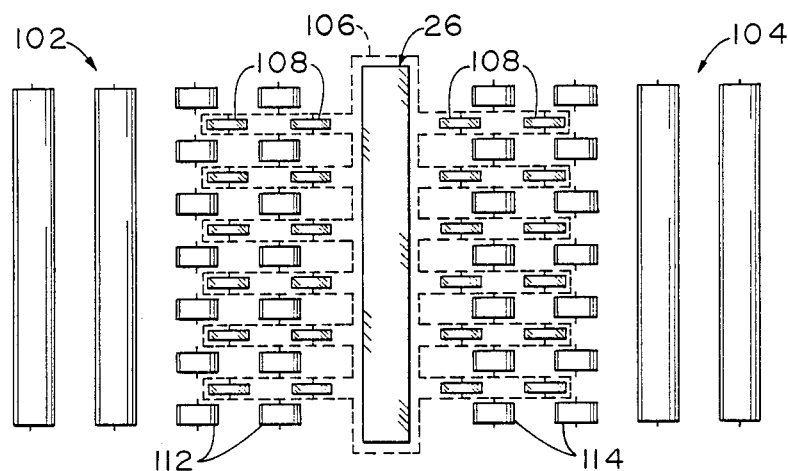
FIG. 6 is a schematic view through line 6—6 of FIG. 5.

In the practice of this invention, the gas hearth support arrangement may be replaced with a roller arrangement. Specifically, the gas hearth supports 18 and 36 shown in FIGS. 1 and 2 may be replaced by roller support sections 102 and 104 shown in FIGS. 5 and 6. With continued reference to FIGS. 5 and 6, sliding support table 106 includes a plurality of ribbon supporting disc members 108 and 110 that are interposed between disc members 112 of roller section 102 and disc members 114 of roller section 104, respectively, so that the sliding table may move along the longitudinal axis of the glass ribbon without interference between the disc members. Disc members 108 and 110 may be mounted to a support plate 116 and moved upstream and downstream relative to the glass ribbon G in a manner similar to that discussed with sliding support table 34. In addition the severing apparatus 26 may be mounted directly to the support plate 116 for movement therewith.

The practice of this invention may include support arrangements other than gas hearth beds or conveying rolls to support the glass during the heating and severing operations. These support arrangements must provide support to the glass while not marking the support surface and thus, adversely affect its optical quality. Although not limited in the present invention, the glass supporting arrangement may include a base material, e.g., ceramic material, layered with a hard, smooth coating, e.g., silicone carbide. The silicone carbide may be polished to provide the conveying surface required to maintain the optical quality of the glass that it supports as it moves thereover.

Figure 7:
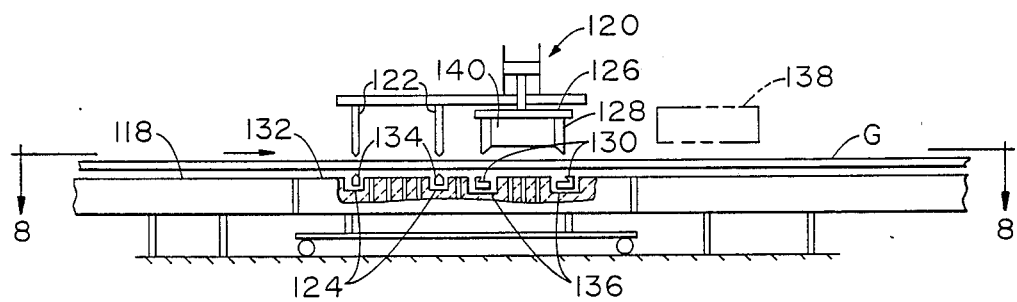
FIG. 7 is a schematic side view of an additional embodiment of the present invention to cut glass shapes from an advancing glass ribbon.
Figure 8:
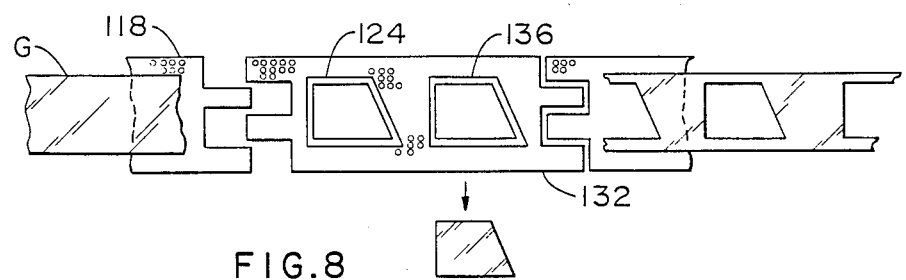
FIG. 8 is a view through line 8—8 of FIG. 7.

The present invention may also be used to sever shaped glass parts from a continuously advancing glass ribbon or advancing glass sheets. Referring to FIGS. 7 and 8, the glass ribbon G is conveyed from a forming chamber (not shown) over a gas hearth support 118 and into a heating and severing station 120. As compared to the heating and cutting arrangement as illustrated in FIGS. 1 through 4 where the glass ribbon was cut along its transverse width, the heating and severing station 120 is similar and includes a pair of line heaters 122 and 124 and a cutter 126 having a blade 128 and anvil 130 configured to correspond to the outer perimeter of the shape of the glass part to be cut. The support table 132 is similar in construction to that shown in support table 34 in FIGS. 1 and 2, except that in the embodiment shown in FIG. 7, slot 134 for burner 124 and a slot 136 for anvil 130 define the peripheral edge of the glass part to be cut. In operation, support table 132 advances with the ribbon G to allow burners 122 and 124 to heat a desired line of cut to the heat softening temperature of the glass. Burners 122 and 124 may, for example, be mounted directly on slotted support table 132 or upper burner 122 may be moved by a separate transport means. When the glass ribbon G is sufficiently heated, support table 132 moves back to the left as viewed in FIG. 7 to heat the next glass part on the ribbon. The heaters 122 and 124 and the cutter 126 are spaced such that when the sliding table 132 moves to reposition the burners for heating the next glass part or the ribbon G, the previously heated glass is aligned below the cutter 126. As the table 132 advances to the right as shown in FIG. 1, and burners 122 and 124 heat the glass, blade 128 of the cutter 126 penetrates the glass ribbon to cut it to its desired shape. After cutting, the ribbon having the severed piece therein proceeds downstream where a vacuum pickup 138 removes the cut glass part from the ribbon and transports it to the next processing station.

As an alternative, the cutting device may include a vacuum pickup 140 as shown in FIG. 7, wherein the glass ribbon G is cut to shape on the downward stroke of the cutter 126 and the glass part is removed from the ribbon by the vacuum pickup 140 positioned within the perimeter of the blades 128. The cut glass part is thereafter conveyed to a another processing station, for example, by way of a tempering ring moved to and positioned below the cut glass sheet while engaged against the vacuum pickup 140 of the cutting device to receive the cut glass part when the vacuum is terminated.

As can now be appreciated the embodiment of the invention shown in FIGS. 7 and 8, and taught, supra, can be similarly used to sever glass parts from a series of advancing heat softened glass sheets.

Figure 9:
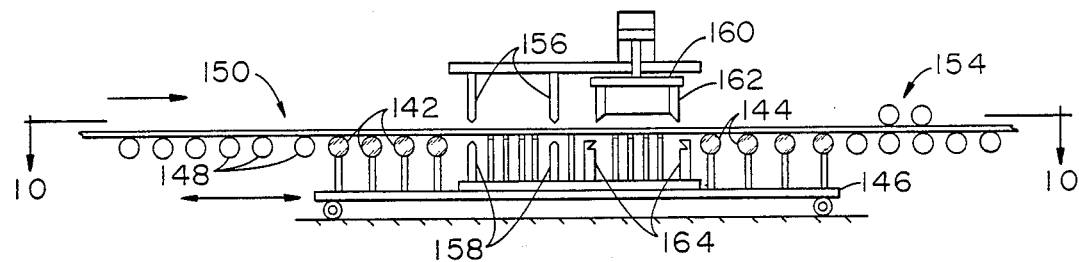
FIG. 9 is a schematic side view similar to that shown in FIG. 7 showing an alternate embodiment of the invention to cut shaped glass parts from an advancing glass ribbon.
Figure 10:
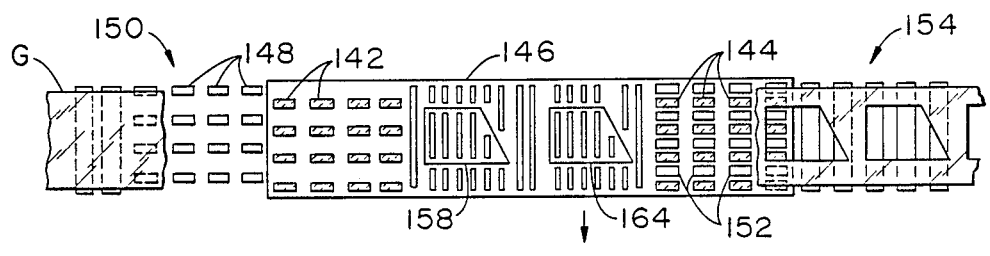
FIG. 10 is a view through line 10—10 of FIG. 9.

The embodiment of a glass part severing apparatus shown in FIGS. 7 and 8, may be modified within the teachings of the invention to a severing apparatus as illustrated in FIGS. 9 and 10. In a manner similar to that shown in FIGS. 5 and 6, FIGS. 9 and 10 illustrate a glass part severing arrangement using a roller type traveling support table. Disks 142 and 144 of support table 146 overlap with rolls 148 of upstream roller section 150, and roll sections 152 of downstream roller section 154, respectively, in a manner similar to that described, supra, with respect to FIGS. 5 and 6. Heaters 156 and 158 and cutting arrangement 160 which include blades 162 and anvil 164 operate in a manner similar to the heaters 122 and 124 and cutting arrangement 126 previously discussed with FIGS. 7 and 8.

Figure 11:
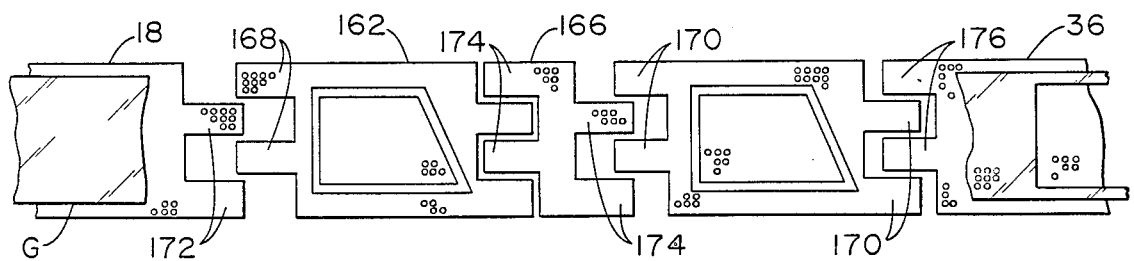
FIG. 11 is a schematic plan view of an alternate embodiment of the invention using multiple support tables.

It would also be obvious to one skilled in the art to replace the single sliding table 34 with a glass heating sliding table 166 and a glass severing sliding table 168 as illustrated in FIG. 11. Tables 166 and 168 are positioned between upstream gas hearth 18 and downstream glass hearth 36. An additional stationary support 170 is positioned between sliding tables 166 and 168. In a manner similar to that discussed, supra, with respect to sliding table 34, sliding tables 166 and 168 are provided with a plurality of arm members 172 and 174, respectively, that move between arm members 176 of gas hearth 18, between arm members 178 of stationary support 170, and between arm members 180 of support bed 34, as required, to support the heat softened glass. This arrangement allows for independent movement of the heaters 28 and 30 and the severing apparatus 26.

The forms of this invention taught herein represent illustrative preferred embodiments and various modifications thereof. It is understood that various changes discussed and others may be made without departure from the scope of the invention as defined by the claimed subject matter which follows.

We claim

1. An apparatus for cutting a glass ribbon advancing along a movement path comprising:
   an upstream support means mounted along said path;
   a downstream support means mounted along said path;
   means moveable from an upstream position to a downstream position between said upstream and said downstream support means to support said ribbon as said ribbon advances along said path;
   means to heat said advancing glass ribbon to define a line of cut, said line of cut heated to the softening point temperature of said glass;
   means to advance said heating means along said path in a fixed relationship with said advancing ribbon;
   means to sever said ribbon along said line of cut; and
   means to advance said severing means along said path in a fixed relationship with said line of cut.

2. The apparatus as in claim 1 wherein said support means includes a support table having a main support portion, spaced fingers extending upstream from said main portion's upstream end, and spaced fingers extending downstream from said main portion's downstream end and further wherein said upstream support means has spaced fingers at its downstream end insertable between said upstream extending spaced fingers of said support table and said downstream support means has spaced fingers at its upstream end insertable between said downstream extending spaced fingers of said support table wherein when said table is in an upstream position relative to said movement path, said upstream extending spaced finger of said table are inserted between and registered with said downstream spaced fingers of said upstream support means and said downstream extending spaced fingers of said table are spaced from and aligned relative to said upstream spaced fingers of said downstream support means, and when said table is in a downstream position relative to said movement path said downstream extending spaced fingers of said table are inserted is between and registered with said upstream spaced fingers of said downstream support means and said spaced from and aligned relative to said downstream spaced fingers of said upstream support means.

3. The apparatus as in claim 2 wherein said second set of fingers are partially registered between said downstream stationary support fingers when said table is in an upstream position and said first set of fingers is partially registered between said upstream stationary support fingers when said table is in a downstream position.

4. The apparatus as in claim 2 wherein said support table further includes guide rail means extending generally in the direction of said glass ribbon movement path, support collars secured to said table and slidably mounted on said guide rail means, and means to move said table along said rail means between said upstream and downstream positions.

5. The apparatus as in claim 2 wherein said heating means includes a line heater to direct flames towards a major surface of said glass ribbon along said line of cut.

6. The apparatus as in claim 5 wherein said heating means includes a top line heater positioned above said glass ribbon to direct flames towards the upper major surface of said glass ribbon along said line of cut and a bottom heater positioned below said glass ribbon to direct flames towards the lower major surface of said glass ribbon along said selected line of cut.

7. The apparatus as in claim 6 wherein said cutting means includes a blade and an anvil member positioned with the major surfaces of said ribbon therebetween such that said line of cut is generally aligned with and parallel to said blade and anvil members and further including means to move said blade relative to said anvil to penetrate at least a portion of the thickness of said glass ribbon.

8. The apparatus as in claim 7 wherein said line heaters and said cutting means are nonlinear so as to effect a nonlinear line of cut.

9. The apparatus as in claim 8 wherein said cutting means further includes a vacuum pickup to transfer the cut glass from said glass ribbon.

10. The apparatus as in claim 8 wherein said line of cut defines the perimeter of a glass part.

11. The apparatus as in claim 7 wherein said main body of said moving table includes a slotted portion, and further wherein said bottom line heater is positioned below said glass ribbon and within said slotted portion of said table to direct flames towards the lower major surface of said glass ribbon along said selected line of cut.

12. The apparatus as in claim 11 wherein said anvil member is mounted on said support table within said slotted portion.

13. The apparatus as in claim 12 wherein said slotted portion of said moving table includes a first slotted portion to support said lower heater and a second slotted portion to support said anvil.

14. The apparatus as in claim 12 wherein said first and second set of finger supports and said main body of said moving table is a gas hearth support bed.

15. The apparatus as in claim 14 wherein said upstream support and said downstream support are gas hearth support beds, and further wherein said upstream and downstream supports are interconnected by a common plenum.

16. The apparatus as in claim 12 wherein said support table includes a glass ribbon supporting surface coated with a finish such that said glass ribbon may slide over said surface without marking said glass.

17. The apparatus as in claim 16 wherein said finish is a polished silicone carbide coating.

18. The apparatus as in claim 7 wherein said moving table includes a plurality of transversely extending conveyor rolls with said first and second set of finger supports including a plurality of supporting disks, said rolls and disks being supported on a moving frame.

19. The apparatus as in claim 18 wherein said conveyor rolls include roll sections positioned adjacent said line of cut, and said lower line heater and said anvil member are positioned between said roll sections.

20. The apparatus as in claim 19 wherein said upstream support means and downstream support means include a plurality of transversely extending conveying rolls and said upstream set of stationary support fingers and said downstream set of stationary support fingers include a plurality of disks.

21. A sliding support table to support advancing glass comprising:
main body portion with a first support surface extending upstream from said main body portion and a second support surface extending downstream from said main body portion; and
means to move said table between an upstream position and a downstream position wherein when said table is in said upstream position, said first support surface is interposed between and registered with a complementing third support surface extending downstream from an upstream support table and said second support surface is spaced from and aligned relative to a complementing fourth support surface extending upstream from a downstream support table, and when said sliding support table is in a downstream position said second support surface is interposed between and registered with said fourth support surface of said downstream table and said first support surface is spaced from and aligned relative to said third support surface of said upstream table.

22. The table as in claim 21 wherein said first, second, third and fourth support surfaces are first, second, third, and fourth sets of spaced finger supports, respectively, wherein when said sliding support table is in said upstream position, said first set of finger supports extending upstream from said main body portion is interposed between and registered with said third set of spaced fingers extending downstream from said upstream table and when said sliding support table is in said downstream position said second set of finger supports extending downstream from said main body portion is interposed between and registered with said fourth set of finger supports extending upstream from said downstream support table.

23. The table as in claim 22 wherein said upstream and downstream support tables are stationery relative to said sliding support table.

24. The table as in claim 23 wherein said table moving means includes guide rail means extending generally in the direction of glass advancement, support collars with a first end secured to said table and a second end slidably engaging said guide rail means, and means to move said table along said rail means between said upstream and downstream positions.

25. The table as in claim 24 further including means to sever said glass, said severing means being mounted on said table to move therewith.

26. The table as in claim 25 wherein said severing means includes a line heater to direct flames towards a major surface of said glass along said line of cut to establish a heating pattern along a line of cut on said advancing glass.

27. The table as in claim 26 wherein said line heater includes a top line heater positioned above said glass to direct flames towards the upper major surface of said glass along said line of cut and a bottom heater positioned below said glass to direct flames towards the lower major surface of said glass along said selected line of cut.

28. The table as in claim 27 wherein said severing means further including a blade and an anvil member positioned with the major surfaces of said glass therebetween such that said blade and anvil members are aligned with said heated line of cut and further including means to move said blade relative to said anvil to penetrate at least a portion of the thickness of said glass.

29. The table as in claim 28 wherein said line heaters and said blade and anvil are nonlinear so as to affect a nonlinear line of cut.

30. The table as in claim 29 wherein said line of cut defines the perimeter of a glass part.

31. The table as in claim 28 wherein said main body of said moving table includes a slotted portion, and further wherein said bottom line heater is positioned below said glass and within said slotted portion of said table to direct flames towards the lower major surface of said glass along said selected line of cut.

32. The table as in claim 31 wherein said anvil member is positioned within said slotted portion of said moving table.

33. The table as in claim 32 wherein said slotted portion of said moving table includes a first slotted portion to support said lower heater and a second slotted portion to support said anvil.

34. The table as in claim 32 wherein said first and second set of finger supports and said main body of said moving table are gas hearth support beds.

35. The table as in claim 32 wherein said finish is a polished silicone carbide coating.

36. The table as in claim 28 wherein said moving table includes a plurality of transversely extending conveyor rolls with said first and second set of finger supports including a plurality of supporting disks, said rolls and disks being supported on said table to move therewith.

37. The table as in claim 36 wherein said conveyor rolls include roll sections positioned adjacent said line of cut, and said lower line heater and said anvil member are positioned between said roll sections.

38. The table as in claim 28 wherein said table includes a glass support surface coated with a finish such that said glass may slide over said surface without marking said glass.

39. A method of severing advancing glass along a selected line of cut comprising:

heating said advancing glass along a desired line of cut to a temperature sufficient for severing;

moving a first support means with said glass to support said glass as said glass advances during said heating step;

severing said glass along said heated line of cut as said glass advances; and moving a second support means with said glass to support said glass as it advances during said severing step.

40. The method as in claim 39 wherein said heating step furrher includes the step of directing high temperature flames from a line heater towards a major surface of said surface of said advancing glass along said line of cut and advancing said line heater in the advancing direction of said glass.

41. The method as in claim 40 wherein line heater is a top line heater and said high temperature flames are directed at an upper major surface of said advancing glass from said top line burner positioned above said advancing glass.

42. The method as in claim 41 wherein said heating step further includes positioning a bottom line heater below said glass and directing high temperature flames from said bottom line heater towards a lower major surface of said advancing glass along said line of cut and advancing said bottom line heater in the advancing direction of said glass and further including the step of securing said top and bottom line heaters to said first movable support means such that said heaters move with said first support means.

43. The method as in claim 42 wherein said severing step includes penetrating a portion of the thickness of said glass along said line of cut with a blade paralleling said heated line of cut to form a severed glass part and advancing said blade in the conveyed direction of said glass during said cutting step.

44. The method as in claim 43 wherein said severing step includes penetrating the full thickness of said glass along said line of cut with said blade.

45. The method as in claim 44 further including the step of mounting said blade on said second support means such that said blade moves with said second support means.

46. The method as in claim 45 wherein said first and second support means is a support table and further including the steps of moving said table from an original position at a rate approximating the advancing rate of said glass during said heating step, reducing the advancing rate of said table relative to said glass to allow said glass with said heating pattern to advance to second portion of said table, and increasing the advancing rate of said table to a rate approximating the advancing rate of said glass after said glass with said heating pattern has moved to said second portion table and prior to said severing step.

47. The method as in claim 46 further including the step of moving said table back to its original position after said severing step.

48. The method as in claim 47 further including the step of transferring said severed glass sheet away from said remaining glass.

49. The method as in claim 48 further including the step of supporting said glass on said support table on a layer of pressured air.

50. The method as in claim 48 further including the step of supporting said glass on said support table on a set of conveying rolls.

51. The method as in claim 48 further including the step of supporting said glass on said support table on a coating of silicone carbide.

52. The method as in claim 46 wherein said directing and severing steps includes directing heat and severing said glass along a nonlinear line of cut.

53. The method as in claim 52 further including the step of maintaining said glass temperature at least as high as the strain point temperature of said glass prior to said severing step.

54. The method as in claim 53 wherein said maintaining step includes maintaining said glass temperature at least as high as the annealing point temperature of said glass prior to said severing step.

55. The method as in claim 54 wherein said heating step includes heating said line of cut to at least approximately 1300° F. (704° C.).

56. The method as in claim 55 wherein said advancing glass is an advancing glass sheet.

57. The method as in claim 55 where said advancing glass is an advancing glass ribbon.

58. The method as in claim 45 wherein said first and second support means are first and second independently movable support tables.

* * * * *